G. L. KLINE.
AUTO CHASSIS.
APPLICATION FILED AUG. 9, 1919.

1,347,337. Patented July 20, 1920.
2 SHEETS—SHEET 1.

Inventor.
George L. Kline.
by Edward E. Longan
Att'y.

G. L. KLINE.
AUTO CHASSIS.
APPLICATION FILED AUG. 9, 1919.
1,347,337. Patented July 20, 1920.
2 SHEETS—SHEET 2.
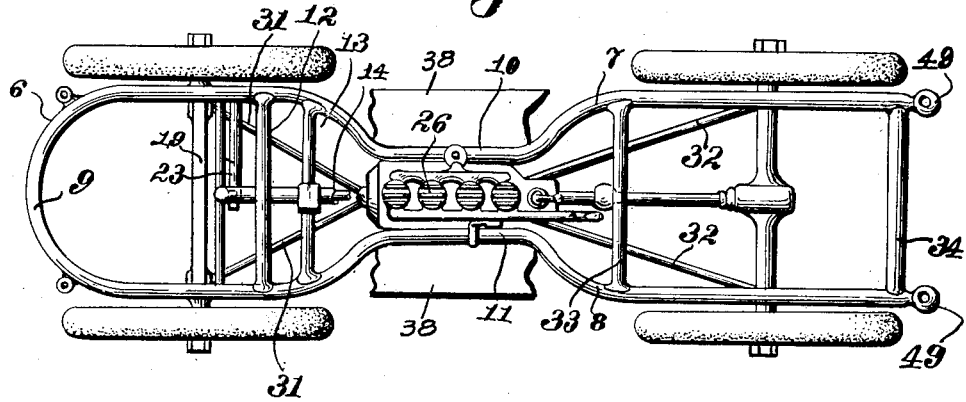
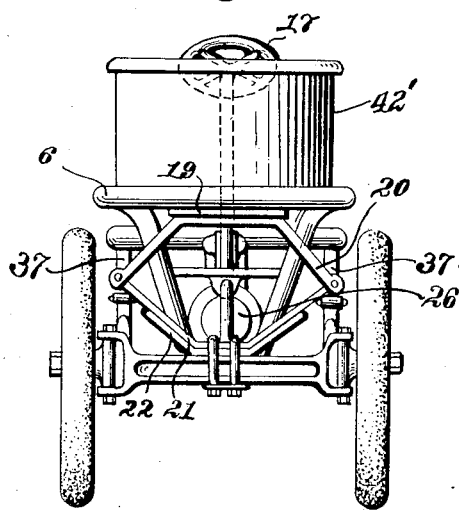 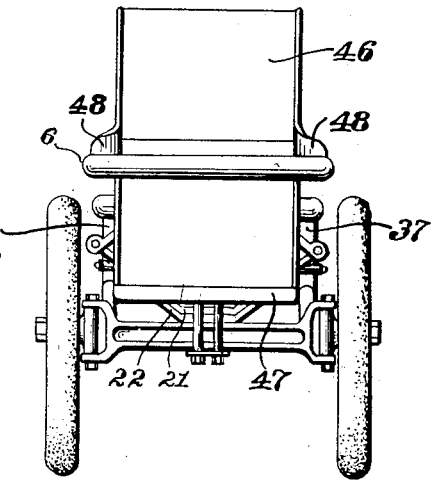
Inventor.
George L. Kline.
By Edward E. Longan
Atty.

UNITED STATES PATENT OFFICE.

GEORGE L. KLINE, OF ST. LOUIS, MISSOURI.

AUTO-CHASSIS.

1,347,337.  Specification of Letters Patent.  Patented July 20, 1920.

Application filed August 9, 1919. Serial No. 316,316.

*To all whom it may concern:*

Be it known that I, GEORGE LEONARD KLINE, a citizen of the United States, and resident of St. Louis and State of Missouri, have invented certain new and useful Improvements in Auto-Chassis, of which the following is a specification containing a full, clear, and exact description, reference being had to accompanying drawings, forming a part thereof.

My invention relates to certain new and useful improvements in automobile chassis and has for its primary object the construction of a chassis for pleasure and delivery cars which is light, durable and inexpensive and so devised and arranged that the center of gravity of the machine to which it is applied is brought low down to the road surface and centrally of the longitudinal and transverse axis of the machine.

In the drawings,

Fig. 3 is a top plan view with the seats and delivery box removed, and also the frame work for the top and lamps, parts of the fenders being broken away.

Fig. 4 is a front elevation, with lamps and fenders removed.

Fig. 5 is a view similar to Fig. 4 with the delivery box removed and a seat applied in its stead.

Figure 1:
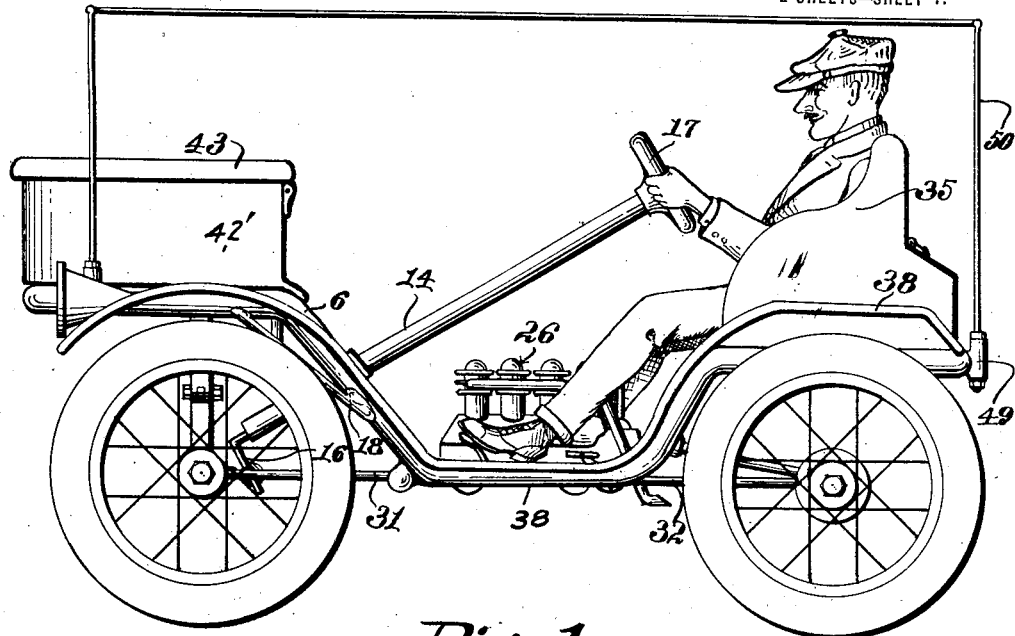
Figure 1 is a side elevation of my improvement.

Referring to the drawings, 6 indicates the frame work of my chassis, which comprises two side members 7 and 8 formed preferably out of a single piece of tubing and bent or bowed centrally as at 9, which projects forward of the front axle of the machine. Each of the side members 7 and 8 have downwardly and inwardly bent portions 10 and 11 respectively.

Extending across the forward end of the chassis is a transverse member or bar 12 which is welded or otherwise secured to the side members 7 and 8. Below the transverse member or bar 12 and in the rear thereof is another bracing member 13. These members 12 and 13 not only stiffen and strengthen the forward portion of the chassis, but also act as a support for the steering column 14, the steering column being secured to the brace 13, there being a vertical bar 15 extending from the cross member 12 to the steering column.

Mounted in the steering column 14 is a steering post 16 on which is mounted the steering wheel 17. Secured to the forward portion of the chassis and extending from the horizontal front portion to the downwardly and inwardly bent portions 10 and 11 are struts or brace rods 18 for the purpose of stiffening and strengthening the chassis at these points.

Extending transversely of the front portion of the chassis and in front of the transverse member 12 is a bar 19 to which the top half 20 of the front spring is secured. The front spring comprises a top portion or half 20 formed of one leaf only and bent or arched as illustrated in Fig. 4, whereas the lower half is likewise shaped and is composed of two leaves 21 and 22. The upper portion of the spring 20 is secured to the cross bar 19, and the lower portion composed of leaves 21 and 22 secured to the front axle.

The lower end of the steering rod 16 is connected with a steering lever 23 in the usual manner.

Figure 2:
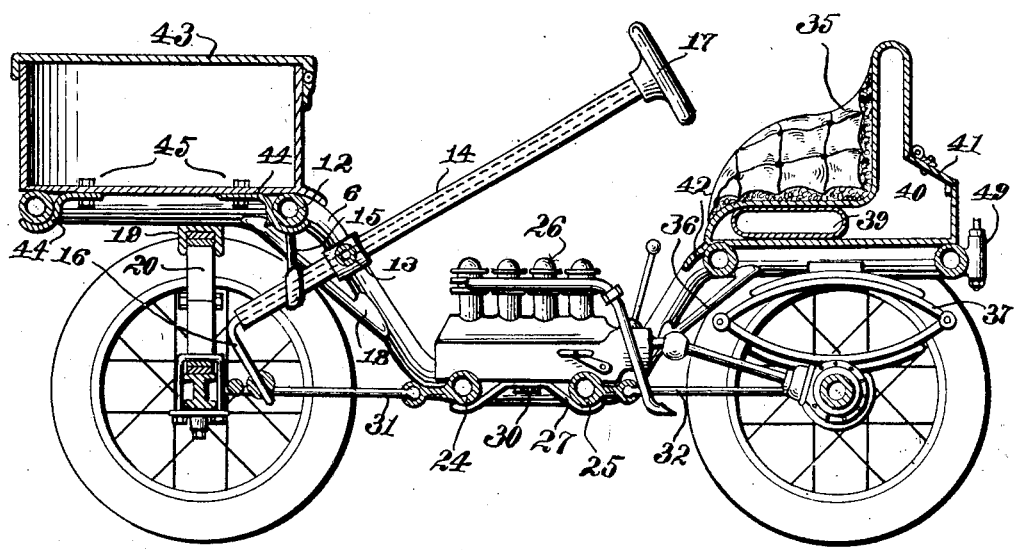
Fig. 2 is a longitudinal section of the same, with fenders removed.

The downwardly and inwardly bent portions 10 and 11 of the side members 7 and 8 are connected together by transverse tubular members 24 and 25. These members form a support or base for the motor 26. The motor 26 is preferably of the motorcycle type and is secured in place on the cross members 24 and 25 by means of a clamp 27, which is fastened to the base of the motor by means of a set screw 30, as fully illustrated in Fig. 2.

The cross member 24 is connected to the front axle by means of brace rods 31, and the transverse tubular member 25 is connected to the rear axle by brace rods 32. See Fig. 3 for illustration. The rear ends of the side members 7 and 8 are connected together by means of transverse braces 33 and 34, which are welded or otherwise secured to the side members 7 and 8 and formed in connection with the rear portions of said side members a horizontal support for the seat 35. Connecting the rear portions of the side members 7 and 8 and the downwardly and inwardly bent portions 10 and 11 are struts or brace rods 36.

The rear portion of the chassis is supported by springs 37, which are secured to the rear axle and the rear portions of the side members 7 and 8. Secured to the side members 7 and 8 and extending throughout the length thereof are fenders 38. These fenders project above the horizontal support of the seat 35 so as to prevent the seat from laterally shifting from its position on said support. In other words, the fenders project along the side of the seat 35 as illustrated in Fig. 1.

The seat 35 has contained therein a gasolene tank 39 and is provided with a compartment 40, which compartment 40 is provided with a hinged lid 41.

The seat 35 is provided with a downwardly extending flange 42 which rests on the cross member or brace 33 and prevents the seat from shifting backward. In fact the seat 35 is held in its position by the fenders 28 and the downward projecting flange or lip 42.

The curved portion 9 of the frame and the cross member 12 form a horizontal seat for the container 42'. This container is provided with a hinged lid 43. The container 42' is removable and is used for carrying merchandise, etc. It is secured in position on the chassis by means of clips 44. Said clips pass under the cross member 12 and the curved or bent portion 9 and are secured to the container 42' by means of bolts 45.

In Fig. 5 I have shown this container removed and a seat 46 mounted on the cross member 12. This seat 46 has a footrest 47 and lateral flanges or projections 48 which rest on the side members 7 and 8. The seat is supported in its position by the cross member 12 and the flanges 48. In other words, the forward portion of the chassis is so devised that the merchandise container 42' may be used, a seat such as 46 may be used if desired, or a hose reel and fire apparatus may be carried if so desired. In fact my chassis is so constructed that the machine may be used as a passenger car, delivery car and a car for carrying fire apparatus.

In the car shown I have made provision for one passenger in the rear and one in front, but if desired two seats large enough to accommodate four passengers, two in the front and two in the rear may be used.

Secured to the chassis at the front and rear ends are sockets 49 in which standards 50 may be placed for carrying a top or cover for the automobile.

Having fully described my invention what I claim is:

1. An automobile chassis comprising tubular side members provided with downwardly and inwardly bent portions forming a support for a motor, transverse members connected to said side portions at the front and rear and forming with said side portions a horizontal support for the rear seat and a horizontal support for a container or front seat.

2. An automobile chassis comprising tubular side members provided with downwardly and inwardly bent portions forming a support for a motor, transverse members connected to said side portions at the front and rear and forming with said side portions a horizontal support for the rear seat, a horizontal support for a container or front seat, bracing bars extending from the horizontal supports to the downwardly and inwardly inclined motor support and braces extending from the front and rear axles to the said motor support.

3. An automobile chassis comprising tubular side members provided with downwardly and inwardly bent portions, transverse members connecting said downwardly and inwardly bent portions for forming a support for a motor, transverse members connected to said side portions at the front and rear and forming with said side portions a horizontal support for the rear seat, and a horizontal support for the container or front seat.

4. An automobile chassis comprising tubular side members provided with downwardly and inwardly bent portions, transverse members connected to said downwardly and inwardly bent portions forming a support for a motor, a transverse member connected to said side portions at the front and rear and forming with said side portions a horizontal support for the rear seat and a horizontal support for a container or front seat, fenders secured to said side members and extending throughout their length, said fenders projecting above the side members to afford means for preventing the seat from shifting laterally on its support.

5. An automobile chassis comprising a continuous tubular member bent substantially centrally of its length so as to form two side members, the bent portion of the tubular member projecting beyond the car or axle in front, and the side members being downwardly and inwardly bent, transverse members connecting the side members at their front and rear, transverse members connecting the downwardly and inwardly bent portions of the side members so as to form a support for a motor, said motor support being disposed centrally of the longitudinal and transverse axis of the chassis, and the terminal portions of the side members and the transverse members which connect them forming horizontal seat supports, and braces extending from the horizontal seat supports to the motor support.

In testimony whereof I have signed my name to this specification, in the presence of two subscribing witnesses.

GEORGE L. KLINE.

Witnesses:
JEAN GOLDBERG,
E. L. WALLACE.